United States Patent
Guenter

(12) 
(10) Patent No.: US 6,875,502 B2
(45) Date of Patent: Apr. 5, 2005

(54) PLASTIC SEPARATING LAYER

(75) Inventor: Walter Guenter, Forchheim (DE)

(73) Assignee: 4P Folie Forchheim GmbH, Forchheim (DE)

( * ) Notice: Subject to any disclaimer, the term of this patent is extended or adjusted under 35 U.S.C. 154(b) by 0 days.

(21) Appl. No.: 09/319,828

(22) PCT Filed: Oct. 9, 1998

(86) PCT No.: PCT/EP98/06424

§ 371 (c)(1),
(2), (4) Date: Jun. 11, 1999

(87) PCT Pub. No.: WO99/20707

PCT Pub. Date: Apr. 29, 1999

(65) Prior Publication Data

US 2001/0055675 A1 Dec. 27, 2001

(30) Foreign Application Priority Data

Oct. 16, 1997 (DE) .......................................... 197 45 624

(51) Int. Cl.$^7$ .............................. B32B 5/16; B32B 9/04; B32B 27/00
(52) U.S. Cl. ....................... 428/220; 428/323; 428/332; 428/446; 428/500
(58) Field of Search ......................... 428/220, 323–331, 428/332, 446, 500, 411.1, 447, 449, 515, 923, 926; 156/244.11

(56) References Cited

U.S. PATENT DOCUMENTS

| | | | | |
|---|---|---|---|---|
| 3,726,710 A | * | 4/1973 | Berger et al. | 117/93.31 |
| 4,978,436 A | | 12/1990 | Kelly | 204/165 |
| 5,932,352 A | * | 8/1999 | Higgins | 428/423.1 |
| 5,942,557 A | * | 8/1999 | Ooms et al. | 522/77 |
| 5,948,517 A | * | 9/1999 | Adamko et al. | 428/219 |
| 5,981,047 A | * | 11/1999 | Wilkie | 428/215 |

FOREIGN PATENT DOCUMENTS

| | | |
|---|---|---|
| EP | 0 366 704 A | 10/1989 |
| EP | 0 622 411 A | 11/1994 |
| WO | WO 98 10724 A | 3/1998 |

* cited by examiner

*Primary Examiner*—Sheeba Ahmed
(74) *Attorney, Agent, or Firm*—Collard & Roe, P.C.

(57) ABSTRACT

Plastic layer that has release properties towards adhesives, where the materials that produce the release properties are incorporated in the plastic layer and can be extruded with it.

5 Claims, No Drawings

PLASTIC SEPARATING LAYER

The invention relates to a plastic layer that has release properties towards adhesives and/or adhesive materials.

Such layers generally consist of silicone and are applied to a plastic film or a similar substrate in a separate operation.

The purpose of the invention is to provide these release properties earlier, in the course of the production process.

In the solution to this problem proposed by the invention, the materials that produce the release properties are incorporated in the plastic layer and can be extruded with it.

This not only facilitates production very considerably; the level of the release properties is easy to set as well.

In accordance with an advantageous further development of the invention, the basic polymer is provided with modified properties, as a result of which the release properties are achieved.

The required strength of the release properties can be taken account already in production of the basic polymer.

In another advantageous further development of the invention, the release additive incorporated is based on silicone compounds.

The level of the release properties can be controlled very easily when the additive is incorporated in this way too.

It is also very advantageous if in accordance with another further development of the invention substances similar to polyolefins are incorporated as release additives.

All of these developments make sure that the materials with which the release properties are achieved only migrate into the adhesive to an insignificant extent if at all.

It has also proved to be very advantageous if the release additives are incorporated in the plastic during polymerisation.

In another advantageous development, the release additives are embedded firmly in the plastic matrix.

In a further advantageous development of the invention, fillers that are, for example, structured as inorganic compounds are provided as release additives.

It has proved to be particularly advantageous in production of the plastic layer if the layer is manufactured from a masterbatch.

In this case, the masterbatch can contain a consistent proportion of the release additives; the final percentage accounted for by the release material is then determined by the plastic-to-masterbatch mixing ratio.

The plastic layer in accordance with the invention can be used as a single-layer material. This single-layer material can be extruded onto a substrate layer.

A plastic film or a paper web can, for example, be provided as the substrate layer.

In accordance with another further development of the invention, it is, however, also possible for the layer to be produced by the coextrusion process. In this case a substrate layer can be provided with the plastic layer with release properties not only on one side but also on both sides.

In accordance with another advantageous further development of the invention, the thickness of the plastic layer is in the 5 mm range.

The release properties can be influenced even more if in accordance with another further development of the invention the plastic layer and/or the substrate film for it is embossed.

In a preferred embodiment, a plastic film is produced by the coextrusion process together with a plastic layer with release properties. The opposite side of the plastic film from the plastic layer can be coated with an adhesive and the film can then be wound up, the release properties of the plastic layer preventing the adhesive from sticking firmly to this layer. The release properties of the plastic layer can be reached in different ways. It is, for example, possible for the basic polymer to be provided with modified properties already. It is, however, also possible for release additives based on silicone compounds to be incorporated. Another possibility is for substances similar to polyolefins to be incorporated as release additives.

The release additives can either be incorporated in the plastic during polymerisation or be embedded firmly in the plastic matrix.

It is in addition possible to provide fillers that are, for example, structured as inorganic compounds as release additives.

It has proved to be advantageous in the production of the release layer if this layer is manufactured from a masterbatch. In this case, the masterbatch can contain a consistent proportion of the release components, while the final percentage is determined by the addition of plastic.

The coextrusion process has proved to be particularly effective in the production operation itself, it being possible to provide the release layer on either one or both sides.

It is, however, also possible to apply the release layer to a substrate web by the extrusion process; a plastic film or a paper web can be used here as the substrate web.

The thickness of the plastic layer is chosen according to the requirements in each individual case; a thickness of about $5\mu$ has proved to be particularly advantageous.

The release layer or—if it is applied to a substrate film—the complete material combination can in addition be embossed, in order to influence the release properties even more.

What is claimed is:

1. A single layer plastic film having release properties towards adhesives and being adapted to be releasably disposed on an adhesive, comprising materials having release properties towards adhesives, wherein the materials having release properties comprise silicone compounds incorporated as additives within the plastic film and are extruded together with said film, said materials being bound within the film so as to prevent substantial diffusion of said materials into the adhesive when said film is disposed thereon.

2. The plastic film according to claim 1, wherein the materials having the release properties are embedded into a matrix of the plastic film.

3. The plastic film according to claim 1, wherein the materials having the release properties further comprise inorganic fillers.

4. The plastic film according to claim 1, wherein the thickness of the plastic film is about 5 $\mu$m.

5. A plastic film adapted to be releasably disposed on an adhesive, comprising materials having release properties towards adhesives, wherein the materials having release properties comprise silicone compounds and polyolefin compounds incorporated as additives within the plastic film and are extruded together with said film, said materials being bound within the film so as to prevent substantial diffusion of said materials into the adhesive when said film is disposed thereon.

* * * * *